United States Patent [19]

Galenkamp et al.

[11] Patent Number: 4,902,527

[45] Date of Patent: Feb. 20, 1990

[54] CONFECTIONERY FATS

[75] Inventors: Hendrik Galenkamp, Amsterdam; Geert Torenbeek, Heerde, both of Netherlands

[73] Assignee: Lever Brothers Company, New York, N.Y.

[21] Appl. No.: 192,420

[22] Filed: May 10, 1988

[30] Foreign Application Priority Data

May 14, 1987 [GB] United Kingdom ............ 8711431

[51] Int. Cl.$^4$ ............ A23D 5/00; C11C 3/12
[52] U.S. Cl. .................... 426/607; 426/601; 426/606; 260/402; 260/405.6
[58] Field of Search ............ 426/601, 606, 607; 260/405.6, 409

[56] References Cited

U.S. PATENT DOCUMENTS

| | | | |
|---|---|---|---|
| 4,260,643 | 4/1981 | Cochran | 426/606 |
| 4,326,932 | 4/1982 | Froling et al. | 204/59 R |
| 4,385,001 | 5/1983 | Rosen | 260/409 |
| 4,424,163 | 1/1984 | Rosen | 260/409 |
| 4,510,091 | 4/1985 | Rosen | 260/409 |
| 4,510,092 | 4/1985 | Rosen | 260/409 |
| 4,537,319 | 10/1985 | Qualeatti | 260/409 |

FOREIGN PATENT DOCUMENTS

| | | |
|---|---|---|
| 108571 | 5/1984 | European Pat. Off. |
| 309502 | 7/1930 | United Kingdom |
| 557620 | 11/1943 | United Kingdom |
| 658188 | 10/1951 | United Kingdom |
| 955788 | 4/1964 | United Kingdom |
| 1107206 | 3/1968 | United Kingdom |
| 1154230 | 6/1969 | United Kingdom |
| 1444820 | 8/1976 | United Kingdom |

*Primary Examiner*—Donald E. Czaja
*Assistant Examiner*—E. Federman
*Attorney, Agent, or Firm*—Milton L. Honig

[57] ABSTRACT

Lauric fats particularly palm kernel oil are selectively hydrogenated to provide at least 25% of the residual unsaturation as trans acid, providing closely similar fats to expensive coconut oil products. The fat may be blended with others, particularly other lauric fats.

12 Claims, No Drawings

CONFECTIONERY FATS

This invention relates to edible fats suitable for use in confectionery and in particular to lauric fats and their preparation.

BACKGROUND AND GENERAL DESCRIPTION

The lauric fats are composed of members of the seed fats of the palmae family which with very few exceptions consist of glycerides of a varied mixture of saturated fatty acids with unusually little in variation of composition throughout the whole family, lauric acid forming approximately half of the total fatty acids of most of the endosperm fats, with myristic acid amounting to about 20% and with significant, but smaller quantities, of capric and caprylic acids, the amount of palmitic and stearic acids being relatively small at less than 10% and 5% respectively and the amount of $C_{18}$ fatty acids generally being substantially less than most vegetable fats and oils, particularly of polyunsaturared fatty acids containing two or more double bonds.

The lauric fats comprise a limited number of members of the family containing less than 20% total unsaturated fatty acids, their overall fatty acid composition providing a melting profile for which these fats are highly prized in confectionery, the principal members available in commercial quantities for this purpose being babassu, coconut and palm kernel fats, although others such as tucum and ucuhuba are also suitable for this purpose. In particular, coconut oil and stearin fractions derived from it by separating its lower-melting glycerides, are widely used in confectionery. Usually 50–75% of the lower-melting components are removed in an olein fraction, commonly by expressing it from the higher-melting stearin fraction under pressure. Alternatively, lauric fats may be hydrogenated to produce harder fats. It has however hitherto been the practice to hydrogenate non-selectively, usually with the aid of an active nickel catalyst, yielding a substantially saturated fat. The melting point of coconut oil when saturated is increased from 23°–25° to approximately 34° C. and palm kernel oil from 27°–29° to approximately 42° C. These hydrogenated fats are valued as toffee fats and for biscuits and other confectionery purposes.

The effect of non-selective hydrogenation however by measuring the amount of stearic acid residues, is progressively to increase solid content index (SCI) of the fat both at 20° C. and 30° C., to a level which is either too high at 30° C. or too low at 20° C. compared with coconut oil stearin, a good quality sample of which may exhibit SCI values of as high as 70–80% or even more at 20° C., and 2% or less at 30° C.

The present invention provides selectively hydrogenated lauric fats. Selective hydrogenation does not effect substantially complete saturation to measure the amount of stearic acid residues, but converts di- and higher unsaturated fatty acids to mono-unsaturated acids. At the same time selective hydrogenation promotes isomerisation of cis-oleic acid to trans-oleic acid, otherwise known as elaidic acid having a higher melting point than the cis acid. Non-selective catalysts may of course be used under hydrogenation conditions which limit the extent of hydrogenation, leaving a product in which a degree of unsaturation remains and in which a modicum of cis/trans isomerisation may occur. However, by its nature non-selective catalysis activity is indiscriminate and capable of leaving polyunsaturated fatty acid residues in the product while at the same time substantially increasing the amount of saturated fatty acid and moreover inducing less trans isomerisation by comparison with selective catalysts.

This difference is reflected in a increase in hardness of the less pronounced products of the invention. The isomerisation is always incomplete, with cis- and trans-isomers in equilibrium. Nevertheless, the fats of this invention exhibit a trans content of preferably at least 25% by weight of the total unsaturated fatty acids present, and more preferably at least 50%. The upper limit of the trans acid content in these terms is of course determined by the cis-trans equilibrium that can be achieved, generally agreed to be of the order of 1:2 molar ratio, the absolute amount of trans acid being determined by the Iodine Value of the fat. Trans-containing i.e. trans-isomerised lauric fats are believed to be novel.

Prior Art

Many publications describe the non-selective hydrogenation of fats and glyceride oils including lauric fats, to form both saturated and incompletely hydrogenated products, and suitable active i.e. non-selective catalysts for this purpose. Many publications also describe selective catalysts by means of which the present invention may be carried out and the extent of isomerisation that takes place with such catalysts, but hitherto these have been applied only to the treatment of non-lauric fats.

In GB 557620 a combined hydrobleaching and non-selective hydrogenation catalyst mixture is used in the treatment of fats and vegetable oils which is said to provide a greater synergistic action. The process may be applied to coconut oil.

GB 658188 describes a process for rapid hydrogenation of fats including coconut oil capable of saturating them. Catalysts which are selective in action eg. metal sulphides are unsuitable for the process.

GB 955788 discloses hydrogenation of palm kernel oil substantially to saturation, with Iodine Values less than 3.

GB 1107206 describes incomplete hydrogenation of lauric fats by non-selective catalysts.

According to GB 1154230 fats including lauric fats are hydrogenated to a limited extent giving a degree of cis/trans isomerisation, following pre-acylation of sterols present in the fats.

According to GB 309502 fats and vegetable oils including coconut oil are hardened by unspecified hydrogenation catalysts.

According to GB 1444820 non-lauric fats hydrogenated to remove polyunsaturation are randomised with lauric fats which may be hydrogenated in an unspecified manner.

In the process described in U.S. Pat. No. 4524086 partially hydrogenated palm kernel oil is used in a confectionery couverture composition. No particulars are given of the method of hydrogenation.

Soviet patent specification no. 604552 describes the hydrogenation of a blend of palm kernel oil and other fats to an Iodine Value of 14 to 18 and randomising a blend of the product with further, substantially saturated non-lauric fats.

EP 10857 describes a method of refining oils including coconut oils, by a combined process of hydrogenation of peroxides, aldehydes and ketones present, with column chromatography to remove polar impurities from the unsaturated fatty oil. No further particulars are given of the treatment of lauric fats, nor of the characteristics of the product fat.

DESCRIPTION OF THE INVENTION

It is surprising that the relatively small amount of polyunsaturation in lauric fats, normally not more than 1 or 2%, and only occasionally as high at 5%, should result in material changes to the melting profile when the fat is selectively hydrogenated. However, absolute selectivity is never achieved and a limited conversion to stearic acid is unavoidable which in conjunction with the hardening effect of trans isomerisation under the influence of selective catalysts, produces a significant change in melting profile of the hydrogenated fat in relation to its performance in confectionery products. The present invention extends both to whole and fractionated lauric fats, whether olein fractions or stearin fractions, and their mixtures. A particularly valuable application of the invention is in the provision of lauric fat compositions from palm kernel oil which closely resemble in melting performance and other attributes relevant to confectionery fats, the excellent characteristics in this respect of high quality coconut stearin. This latter fat is however obtained in relatively low yield by fractionation from coconut oil and is therefore expensive to produce. In contrast, palm kernel stearin obtained in substantially greater amount from palm kernel oil may be selectively hydrogenated to provide products in accordance with the invention which closely resemble coconut stearin and may be used as a substitute therefor.

In terms of chemical composition, the hardened palm kernel fats should retain a substantial degree of the unsaturation of the unhydrogenated fat, reflected by a minimum Iodine Value 5, and for hardened palm kernel olein or hardened whole oil of at least 10. The Iodine Value of palm kernel oil itself varies from 15 to 23 according to source and generally the fall in Iodine Value resulting from selective hydrognation is preferably 1 to 5 units. Correspondingly the stearic acid content of the hardened palm kernel oil should not substantially increase. Expressed as a percentage of total fatty acids palm kernel oil contains approximately 2 to 4% stearic acid, and that of the hardened palm kernel fats of the invention should be 1 to 6% greater on the same basis. Alternatively expressed, there should be more unsaturated than saturated $C_{18}$ acid present: preferably from 60 to 90% originally present remaining unsaturated.

In physical terms the hardened palm kernel products of the invention should preferably exhibit SCI values at 20° and 30° C. of at least 70 and at most 5, more preferably from 75 to 90 and 0 to 3. Preferably blends of palm kernel fat according to the invention contain 30–70:-70–30 parts by weight of each.

A wide range of selective catalysts is available suitable for use in the process of this invention, for example nickel supported on a diatomaceous earth support and sulphur-treated to provide selectivity.

Sulphur treatment may be effected by pre-use of the catalyst to hydrogenate oils and fats containing sulphur, for example rapeseed oil. Alternatively sulphur may be added to the lauric fat in appropriately small quantities for the purpose.

The invention also relates to blends of selective lauric fats with other fats, particularly other lauric fats, preferably in the proportions by weight of from approximately 1:2 to approximately 2:1, especially in approximately equal proportions of each component of the blend. More preferably the blends are composed of palm kernel oil or its fractions in which at least some of the components are selectively hydrogenated and more particularly the remainder are non-selectively hydrogenated.

The invention also provides a process for the preparation of a substitute fat for coconut oil comprising selectvely hardening palm kernel oil under the influence of a selective hydrogenation catalyst and under isomerisation conditions until at least 25% of the total unsaturated fatty acid residues of the fat are isomerised to trans acid.

EXAMPLE

Palm kernel oil having an Iodine Value of 18 was pressed to recover a stearin fraction having an Iodine Value of 8. Each was selectively hydrogenated in 2 kilogram batches with stirring at 190° C. and 2 to 3 bar pressure, in the presence of approximately 0.5% by weight of the oil, of the selective hydrogenation nickel catalyst PRICAT 9908 supplied by Unichema International. Pressure was increased to about 3 bar over an hour, and this was maintained for another 2 or 3 hours. Tests showed, however, that the reaction was substantially complete within 2 hours. The treated oil was recovered conventionally.

Further particulars are given in the accompanying Table which includes data on blends on the fats in equal proportions, except where indicated for the blend in the last entry in the FAT column. The last two entries in the FAT column were obtained by co-hardening as indicated. The data for coconut stearin is included for comparison, the blends showing excellent comparison with it.

Biscuits coated with the blended table were pronounced virtually indistinguishable in organoleptic response and handle to similar coatings prepared from the coconut stearin. The selectively hardened palm kernel olein (hPKf) as found to be an excellent alternative to palm kernel oil non-selectively hardened to a slip melting point of 35° C. Blends of approximately two parts per part.

TABLE

| FAT | HYDROGN. HOURS | IV | SCI % (NMR) *Min. commercial specification | | $C_{18:1}$ | | CIS/TRANS RATIO | ACIDS % TOTAL ACIDS | |
|---|---|---|---|---|---|---|---|---|---|
| | | | 20° C. | 30° C. | CIS | TRANS | | $C_{18:0}$ | $C_{18:2}$ |
| CNs | — | 4.5 | *72–83 | *max. 2 | 4.5 | 0 | — | +2.5 | +1.5 |
| PK | — | 18 | *42–50 | " | 16.0 | 0 | — | 2.5 | 2.0 |
| PKs | — | 8 | *min 80 | 26–32 | 7.0 | 0 | — | 3.0 | 1.0 |
| PKf | — | 27 | *8–12 | 0 | 25.0 | 0 | — | 3.2 | 3.0 |
| PK:PKs = | | | | | | | | | |
| 50:50 | — | 14.0 | — | — | 11.3 | 0.0 | — | | |
| 70:30 | — | 16.2 | — | — | 12.8 | 0.0 | — | | |

TABLE-continued

| FAT | HYDROGN. HOURS | IV | SCI % (NMR) *Min. commercial specification 20° C. | SCI % (NMR) *Min. commercial specification 30° C. | CIS | $C_{18:1}$ TRANS | CIS/TRANS RATIO | ACIDS % TOTAL ACIDS $C_{18:0}$ | ACIDS % TOTAL ACIDS $C_{18:2}$ |
|---|---|---|---|---|---|---|---|---|---|
| hPK | 4 | 14.8 | 64 | 0 | 6.9 | 9.5 | 0.73 | 3.9 | 0.1 |
| hPKs | 4 | 6.6 | 91.8 | 22.4 | 2.8 | 3.7 | 0.76 | 3.4 | 0.1 |
| hPKf | 4 | 22.5 | 28.9 | 0 | 9.4 | 14.3 | 0.66 | 4.0 | 0.1 |
| h(PK:PKs) (50:50) | 1 | 11.8 | 75.7 | 1.0 | 3.6 | 7.9 | 0.46 | | |
|  | 2 | 11.1 | 78.4 | 0.2 | 3.9 | 6.9 | 0.56 | | |
|  | 3 | 10.9 | 78.9 | 1.1 | 4.7 | 6.7 | 0.72 | | |
|  | 4 | 10.5 | 80.7 | 2.9 | 5.1 | 6.1 | 0.83 | | |
| h(PK:PKs) (50:50) | 1 | 13.7 | 60.7 | 4.3 | 4.4 | 9.0 | 0.49 | 2.7 | 1.7 |
|  | 2 | 12.9 | 72.0 | 0 | 4.3 | 8.3 | 0.52 | | |
|  | 3 | 12.5 | 73.0 | 0.1 | 4.8 | 7.5 | 0.65 | | |
|  | 4 | 12.4 | 73.7 | 0.8 | 5.1 | 7.0 | 0.73 | 3.9 | 0.1 |

LEGEND:
CN = Coconut oil
PK = Palm kernel oil
h = hardened
s = stearine fraction
f = olein fraction
I.V. = Iodine Value
S.C.I. (NMR) = Solids Content Index determined by Nuclear Magnetic Resonance methods
$C_{18:0}$ = Stearic Acid
$C_{18:2}$ = Linoleic Acid

We claim:

1. Fat suitable for use in confectionery comprising hardened lauric fat selected from palm kernel oil and its fractions and unsaturated fatty acid content of which comprises at least 25% transacid and contains more unsaturated than saturated $C_{18}$ acid.

2. Fat blend according to claim 1 comprising a selectively hardened blend of lauric fats selected from the group comprising palm kernel oil and its fractions wherein the proportion of palm kernel oil to its fractions ranges from 70:30–30:70.

3. Fat according to claim 1 the trans acid content of which is in substantial equilibrium with the cis acid content thereof.

4. Fat according to claim 1 having an Iodine Value of at least 5.

5. Hardened unsaturated palm kernel oil suitable for use in confectionery according to claim 1 which comprises 60–90% by weight of the unsaturated $C_{18}$ fatty acid originally present in the oil remaining unsaturated and at least 25% trans acid.

6. Hardened palm kernel oil according to claim 1 having an Iodine Value of at least 10.

7. Hardened palm kernel oil according to claim 5 having an Iodine Value 1 to 5 units below that of the unhardened oil.

8. Hardened palm kernel oil according to claim 5 having a stearic acid content 1 to 6% greater than the unhardened oil.

9. Hardened palm kernel oil according to claim 5 having SCI values of at least 70 at 20° C. and at most 5 at 30° C.

10. A fat blend according to claim 2 in a weight proportion from about 1:2 to about 2:1.

11. A fat blend according to claim 2 wherein one fat is selectively hydrogenated and the other is non-selectively hydrogenated.

12. Method of preparing fat suitable for use in confectionery comprising hydrogenating lauric fat selected from palm kernel oil and its factions under the influence of a selective catalyst under isomerisation conditions wherein at least 25% by weight of the total unsaturated fatty acid residues of the fat are isomerised to transacid and the fat contains more unsaturated than saturated fatty acid residues.

* * * * *